US006143105A

United States Patent [19]

[11] Patent Number: 6,143,105

[45] Date of Patent: Nov. 7, 2000

Nash et al.

[54] SEMI-AUTOMATIC MAILPIECE PRINTER/ LABEL APPLICATOR

[75] Inventors: Thomas P. Nash, Getzville; Frank C. DeReu, Tonawanda; Eric V. Palmer, Amherst; Joseph T. Duffy, Tonawanda; James M. Schweitzer, Lancaster, all of N.Y.

[73] Assignee: Moore U.S.A., Inc., Grands Island, N.Y.

[21] Appl. No.: 09/066,708

[22] Filed: Apr. 27, 1998

[51] Int. Cl.$^{7}$ .............................. B32B 31/18; B32B 31/20

[52] U.S. Cl. ............................ 156/64; 156/270; 156/299; 156/DIG. 2; 156/351; 156/355; 156/363; 156/521; 156/542

[58] Field of Search ...................................... 156/517, 518, 156/520, 521, 542, 351, 355, 363, 64, 270, 299, DIG. 2

[56] References Cited

U.S. PATENT DOCUMENTS

| | | | |
|---|---|---|---|
| 3,576,695 | 4/1971 | Stine | 156/517 |
| 4,029,537 | 6/1977 | Kish | 156/497 |
| 4,295,915 | 10/1981 | Sakaguchi et al. | 156/361 |
| 4,321,103 | 3/1982 | Lindstrom et al. | 156/351 |
| 4,324,608 | 4/1982 | Klinger | 156/351 |
| 4,468,274 | 8/1984 | Adachi | 156/320 |
| 4,595,447 | 6/1986 | Lindstrom | 156/364 |
| 4,712,114 | 12/1987 | Kikuchi | 346/76 PH |
| 4,784,714 | 11/1988 | Shibata | 156/354 |
| 4,980,009 | 12/1990 | Goodwin et al. | 156/249 |
| 4,985,096 | 1/1991 | Bekker-Madsen | 156/64 |
| 5,112,429 | 5/1992 | Costas | 156/542 |
| 5,232,540 | 8/1993 | Southwell et al. | 156/361 |
| 5,261,996 | 11/1993 | Rossini | 156/521 |
| 5,292,713 | 3/1994 | Stenzel et al. | 503/226 |
| 5,375,752 | 12/1994 | Michalovic | 252/2 |
| 5,378,301 | 1/1995 | Boreali et al. | 156/344 |
| 5,417,783 | 5/1995 | Boreali et al. | 156/64 |
| 5,470,420 | 11/1995 | Yokajty | 156/566 |
| 5,520,773 | 5/1996 | Hollis et al. | 156/486 |
| 5,524,996 | 6/1996 | Carpenter et al. | 400/621 |
| 5,560,293 | 10/1996 | Boreali et al. | 101/288 |
| 5,833,803 | 11/1998 | Strohmeyer et al. | 156/517 |
| 5,853,530 | 12/1998 | Allen | 156/541 |
| 5,891,300 | 4/1999 | Oussani, Jr. et al. | 156/541 |

FOREIGN PATENT DOCUMENTS

| | | | |
|---|---|---|---|
| 0361693 | 4/1990 | European Pat. Off. | B65C 11/02 |
| 0577241 | 1/1994 | European Pat. Off. | B65C 9/18 |

*Primary Examiner*—Richard Crispino
*Assistant Examiner*—George R. Koch, III
*Attorney, Agent, or Firm*—Nixon & Vanderhye P.C.

[57] ABSTRACT

A label applicator, easily mounted on a desktop in association with a label printer, has a compact configuration with no external power requirements since the components are electrically powered and the power is received from the printer. Preferably the label does not move during application, providing a high degree of accuracy and placement. The applicator may be used with both linered and linerless labels and associated printers, and uses inexpensive components. Positive stops are provided for stopping the movement of a label into the applicator housing, and the manual movement of a mailpiece into the applicator housing. Sensors sense the label and the mailpiece when accurately aligned, and cause actuation of a linear solenoid with tamp pad to move the mailpiece vertically upwardly into contact with the label pressure sensitive adhesive. The label is held in place in the desired position by one or more electric fans exhausting air from the opposite face of an apertured plate from the label.

20 Claims, 5 Drawing Sheets

SEMI-AUTOMATIC MAILPIECE PRINTER/ LABEL APPLICATOR

BACKGROUND AND SUMMARY OF THE INVENTION

There are a number of situations in which it is necessary to accurately place a label in association with a substrate. This is most common for mailpieces which have address labels thereon including bar coding or other machine readable information designed to be used with postal service scanners. While commercial mechanisms exist for automatically applying labels in a substantially accurate manner to mailpieces, typically used tamp mechanisms are pneumatically powered, and there are many complex components which make such applicators expensive (e.g. greater than U.S. $20,000.00). Also, they are difficult to install, noisy, and take up more than a desirable amount of work space. For example, see U.S. Pat. No. 4,595,447. Other automatic applicators (such as shown in U.S. Pat. Nos. 4,784,714 and 4,321,103, and European published application 0577241), even if they do not require pneumatic tamp mechanisms, have a significant number of complex components and/or do not apply the labels to the mailpieces, or other substrates, with a high degree of accuracy.

According to the present invention, a label applicator, and a method of applying labels to substrates, are provided that have the necessary accuracy to apply address labels to mailpieces so that they may be effectively automatically scanned by postal equipment, yet are relatively simple and inexpensive. The applicator according to the invention is semi-automatic, is compact so that it can fit on a desktop (in fact both an associated printer and the label applicator can fit on a desktop), no pneumatic hookup is typically required, and no external power is typically required since the electricity for powering the label applicator may come directly from the printer. Also, in the preferred embodiment the mailpiece is moved into contact with the label; since the label does not move during application this gives greater accuracy in placement. The applicator is compatible with both linered and linerless labels and printers, and can be used with printers of a variety of types including thermal transfer, direct thermal, and ink jet. The applicator may be mounted with the printer, or easily detached from the printer, and the cost of the applicator is less than half of commercial automatic applicators.

According to one aspect of the present invention, a label applicator is provided comprising the following components: A label feed mechanism which feeds a label having a first face with pressure sensitive adhesive and a second face with indicia printed thereon. A label positive stop cooperating with the feed mechanism to stop a label fed by the feed mechanism in a first desired position. A holding device which holds the label in the first desired position. A substrate positive stop which stops a substrate at a second desired position in alignment with a label at the first desired position. And automatic means for moving a substrate at the second desired position into, and then out of, contact with the pressure sensitive adhesive of a label at the first desired position so that the label sticks to the substrate, and is removed from the holding device with the substrate.

The automatic means for moving the substrate may comprise a wide variety of structures. For example, it may comprise a traveling nut on a screw which is powered by an electric or pneumatic motor, a pneumatic cylinder, or a variety of other conventional primarily linear actuators. In the preferred embodiment, however, the automatic means comprises a linear solenoid and a tamp pad connected thereto. Preferably, the substrate positive stop is vertically below the label positive stop, and the linear solenoid is positioned so as to move the tamp pad, and a substrate (such as a mailpiece) thereon, at least primarily upwardly to bring the substrate into contact with the label adhesive. The label positive stop is vertically movable upon contact with the tamp pad; for example the label positive stop may comprise one or more pins which fit through openings in a surface against which the label is held, with a head preventing the pins from falling through the openings, but the pins unconnected to the surface so that they may reciprocate up and down. A number of different holes may be provided so that the position of the label stop is adjustable.

Preferably, the label feed mechanism, the label positive stop, holding device, substrate positive stop, and solenoid are mounted within a housing dimensioned to fit on a desktop. The holding device may comprise a support having first and second faces with one or more apertures therein extending between the faces, the first face for engaging a label; and one or more electric fans adjacent the second face and positioned to pull air through the one or more apertures, suction created by the one or more fans holding a label to the first face. The label feed mechanism may comprise at least one set of rollers (e.g. one set within the label applicator, and possibly—especially where linerless labels are used—another set in the printer).

The automatic means for moving the substrate preferably are controlled by a control device having at least two position sensors for sensing the position of a label and a substrate, respectively. There may be further provided a printer for printing indicia on the label second face, the printer also dimensioned to fit on a desktop, and a mounting plate connecting the printer and housing together at a bottom portion of each, the mounting plate having feet extending downwardly therefrom. Where the applicator is for use with a substrate, there preferably is further provided a mailpiece support extending outwardly from the housing opposite the feed mechanism, the support plate facilitating manual movement of a mailpiece into the housing to contact the positive stop. A solenoid, sensors (e.g. optical sensors), feed mechanism, and holding device are preferably electrically powered, electric power being provided by connection to the printer.

According to another aspect of the present invention a method of applying address labels to a mailpiece in a semi-automatic manner using a label applicator including label and mailpiece positive stops and housing, each label having a first face with pressure sensitive adhesive, and a second face with address indicia thereon, is provided. The method comprises the steps of: (a) Feeding a label into the housing until positively stopped at a first desired position so that the first face thereof is substantially uncovered. (b) Releasably holding the label in the first position. (c) Feeding a mailpiece into the housing until positively stopped at a second desired position aligned with the first position. (d) Sensing the label and mailpiece contemporaneously at the first and second positions, respectively. (e) In response to step (d) automatically effecting relative movement of the label and mailpiece with respect to each other so that the adhesive of the label sticks to the mailpiece. And (f) removing the mailpiece from the housing, with the label applied, the label being automatically released from being held in the first position.

Steps (c) and (f) are preferably practiced manually, and step (e) is practiced by moving the mailpiece while the label remains substantially stationary. There may also be the further step of adjusting the positive stops for both the label and the mailpiece to accommodate labels and mailpieces of different sizes or configurations. Step (d) may be practiced optically, utilizing two different sensors, one for the mailpiece and the other for the label. There is also preferably the further step of printing the label second face (e.g. by thermal transfer, direct thermal, or ink jet techniques) substantially immediately (typically, during normal operation, only about 5–20 seconds) before the label is applied to the mailpiece.

According to another aspect of the present invention a desktop mounted label printer and applicator assembly is provided. The assembly preferably comprises the following components: A printer comprising a housing, a print head within the housing, and a source of electric power. A label applicator disposed in a housing. A feed mechanism which feeds printed labels from the printer housing into the label applicator housing, the feed mechanism being electrically powered. The housings are dimensioned and configured to collectively fit on a desktop. An electrically powered label holding device disposed in the label applicator housing. An electrically powered device which effects relative movement between a substrate (e.g. mailpiece) and the label so that pressure sensitive adhesive on one face of the label moves into contact with, and adheres to, the substrate, disposed within the label applicator housing. Electrically powered sensors for sensing the relative positions of the label and substrate, the sensors disposed in the label applicator housing. And the electrically powered holding device, moving device, and sensors, connected up to the source of electrical power of the printer. The details of the mechanisms utilized herein are preferably as described above, although under some circumstances other mechanisms may be utilized (such as a pneumatically operated moving device for moving the label with respect to the substrate, etc.).

It is the primary object of the present invention to provide a simple yet effective label applicator, combination label printer and applicator assembly, and method of applying labels to mailpieces or other substrates, which are simple, inexpensive, yet highly accurate in placement of labels on substrates. This and other objects of the invention will become clear from a detailed description of the invention and from the appended claims.

DETAILED DESCRIPTION OF THE DRAWINGS

Figure 1:
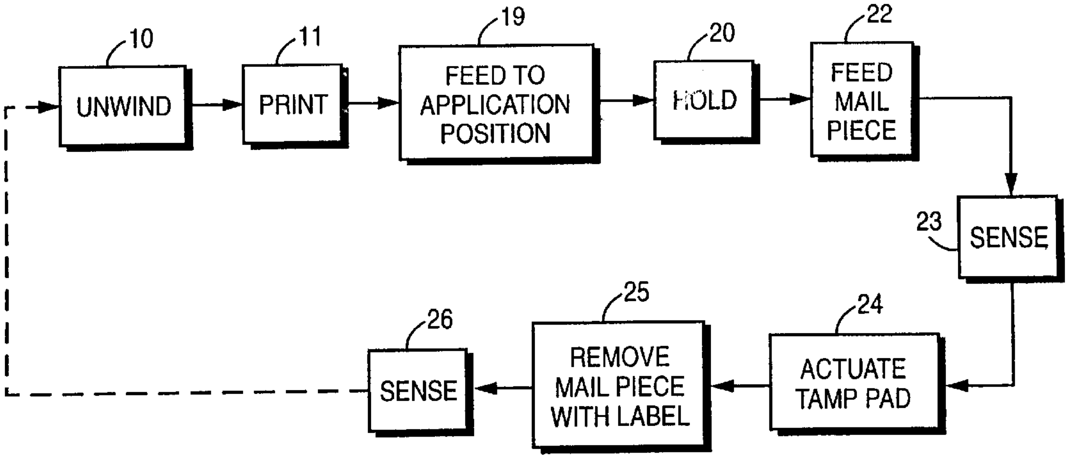
FIG. 1 is a diagrammatic representation of an exemplary method according to the present invention.

FIG. 1 schematically illustrates an exemplary method that may be practiced according to the present invention. Either linered or linerless labels are unwound from a roll, as indicated at 10, and transported to a printing station 11. Each of the labels—seen generally by reference numeral 12 in the drawings—has a first surface 13 (see FIGS. 3 through 5) with pressure sensitive adhesive (see 14 in FIG. 5) thereon, and a second surface 15 onto which indicia 16, 17 is printed. In the preferred embodiment the labels 12 are mailing labels and the indicia printed included human readable address indicia 16 and machine readable (e.g. bar code) indicia 17 which can be readily read by postal scanners and the like.

After printing at print station 11, the label 12 is fed to the application station as indicated schematically at 19 in FIG. 1, where it is releasably held in position as indicated at 20.

A mailpiece 21 (see FIGS. 3, 5 and 8) is then fed into association with the label 12 as indicated schematically at 22 in FIG. 1. The mailpiece 21 feeding is typically manual, although it may be mechanized if desired. The positions of the label 12 and mailpiece 21 (one or both positions) are sensed as indicated at 23 in FIG. 1, and then a relative movement effecting device is actuated, as illustrated at 24 in FIG. 1, to effect relative movement between the label 12 and the mailpiece 21 so that the label 12 is adhesively applied to the mailpiece 21. As will be hereinafter described preferably the mailpiece 21 is moved primarily upwardly into contact with the label 12 while the label 21 is releasably held in position. Preferably both the label 12 and the mailpiece 21 are positively stopped at the desired positions to which they are moved.

Once the label 12 has been applied to the mailpiece 21, the mailpiece 21 is removed from the label applicator, with the label 12 attached, as indicated schematically at 25 in FIG. 1. This movement also is preferably manual. The lack of a label 12 is then sensed as indicated schematically at 26 in FIG. 1, and then the process is repeated.

Figure 2:
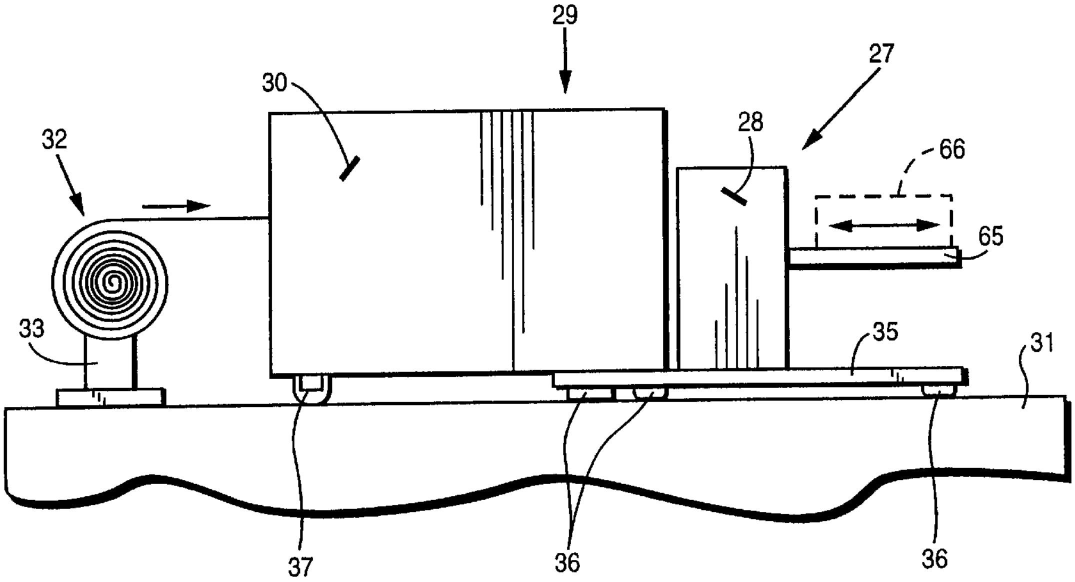
FIG. 2 is a side schematic view of an assembly of a label printer and a label applicator according to the present invention, mounted on a desktop.

FIG. 2 schematically illustrates a label applicator, shown generally by reference numeral 27, according to the invention, in a housing 28, and operatively associated in an assembly with a printer 29 in a housing 30. The printer 29 may be of any conventional type for printing labels, e.g. by thermal transfer, direct thermal, or other like techniques. Preferably the printer 29 and the label applicator 27 collectively easily fit on a desktop 31.

In FIG. 2, a roll of labels 32 is shown mounted by a support 33 on the desktop 31 exteriorly of the printer 30, however the roll 32 may just as easily be disposed within the housing 30 of the printer 29. The roll 32 may be linerless labels (e.g. such as shown in U.S. Pat. Nos. 5,292,713 or 5,417,783), or conventional linered labels. The housings 30, 28 may be mounted on a common mounting plate 35 (see FIGS. 2 and 3) which has conventional feet (e.g. rubber pads) 36 extending downwardly therefrom and engaging the desktop 31. The printer housing 30 may have other feet 37 at other portions thereof. The plate 35 may be provided so that it is easily disconnected from the printer housing 30 by disconnecting readily releasable fasteners (such as screws), or by making a slide connection with the bottom of the housing 30, or in any other suitable conventional manner for connecting the plate and housing together. Alternatively, the plate 35 may be permanently attached to the printer housing 30 and a separate bottom (not shown) of the housing 28 may be connected by releasable fasteners, or the like, extending through flanges exterior of the housing 28 to the plate 35.

Figure 3:
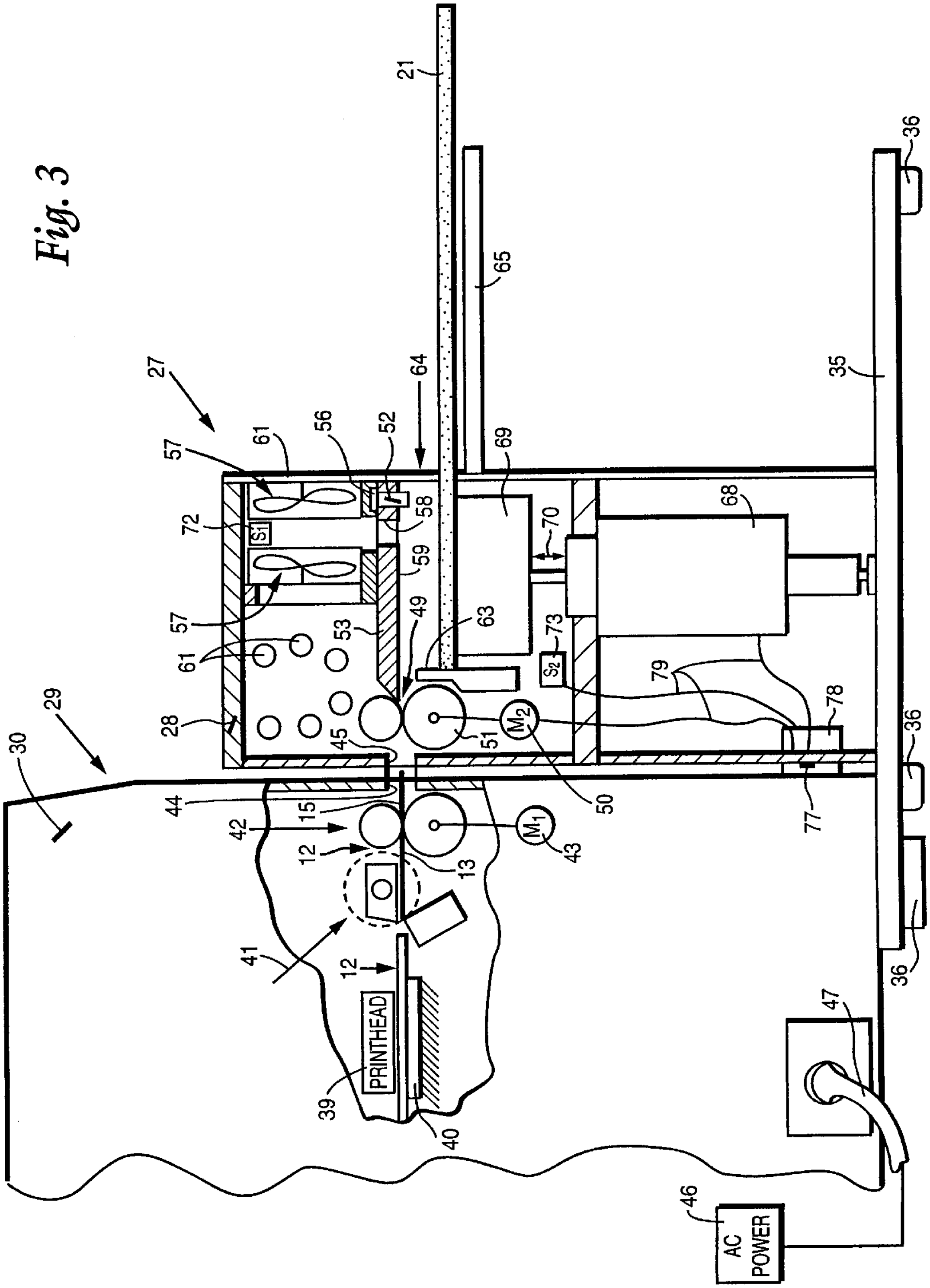
FIG. 3 is a side schematic view, partly in elevation but mostly in cross section, of part of the printer, and all of the label applicator, of FIG. 2.

FIG. 3 illustrates a printer 29 which prints linerless labels 12. The print head for the printer 30 is illustrated schematically at 39 in FIG. 3, while a cooperating surface 40, having adhesive release properties, is shown in juxtaposition to the print head 39. Any suitable conventional structures 39, 40 may be provided, including different types of thermal print heads.

Figure 7:
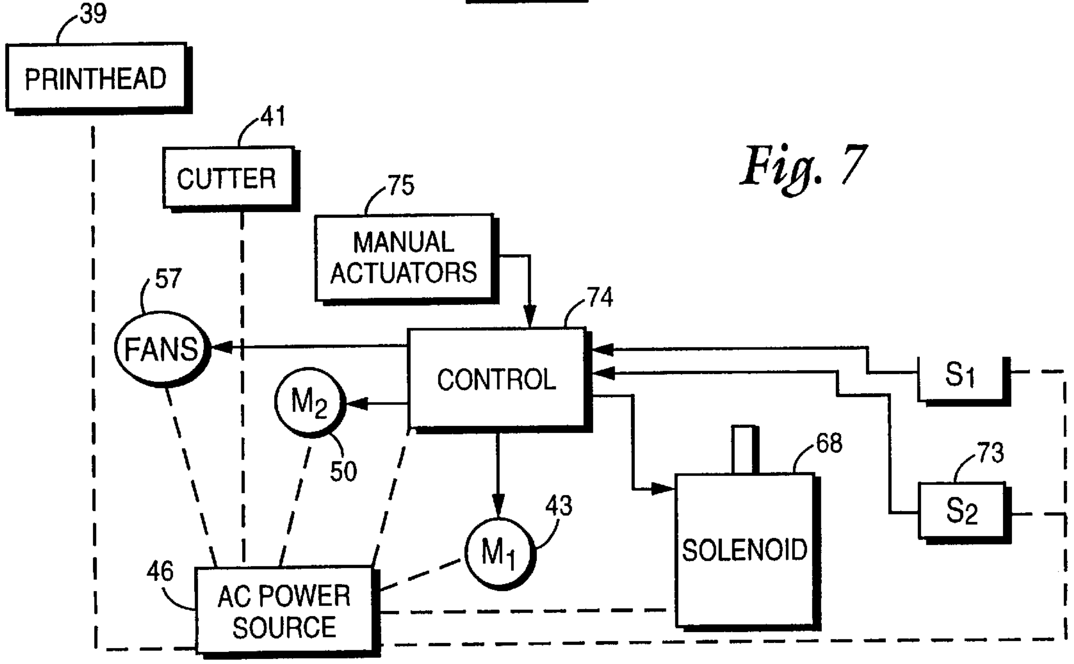
FIG. 7 is an electrical schematic showing the interconnection between the components of the label applicator.

Disposed within the linerless label printer 29 of FIG. 3 there also is a cutter, shown schematically at 41, for cutting the labels 12 from each other. The cutter 41 may be of any conventional construction. A transport or feed mechanism 42 is provided downstream of the cutter 41, but within the housing 30, for engaging the label 12 and feeding it to the applicator 27. In the embodiment of the feeder transport mechanism 42 illustrated in FIG. 3, two low speed rollers, powered by a conventional electric motor 43, are illustrated for feeding the label 12 out of the discharge opening 44 in the housing 30 into and through an inlet opening 45 in the housing 28 for the label applicator 27. Typically all of the printer 29 components are powered by electricity, such as the conventional AC power source illustrated schematically at 46 in FIGS. 3 and 7, for example, a cable 47 provided for connecting all of the wires for the electrical devices within the printer 29—and also within the applicator 27—to the AC power source 46.

Figure 4:
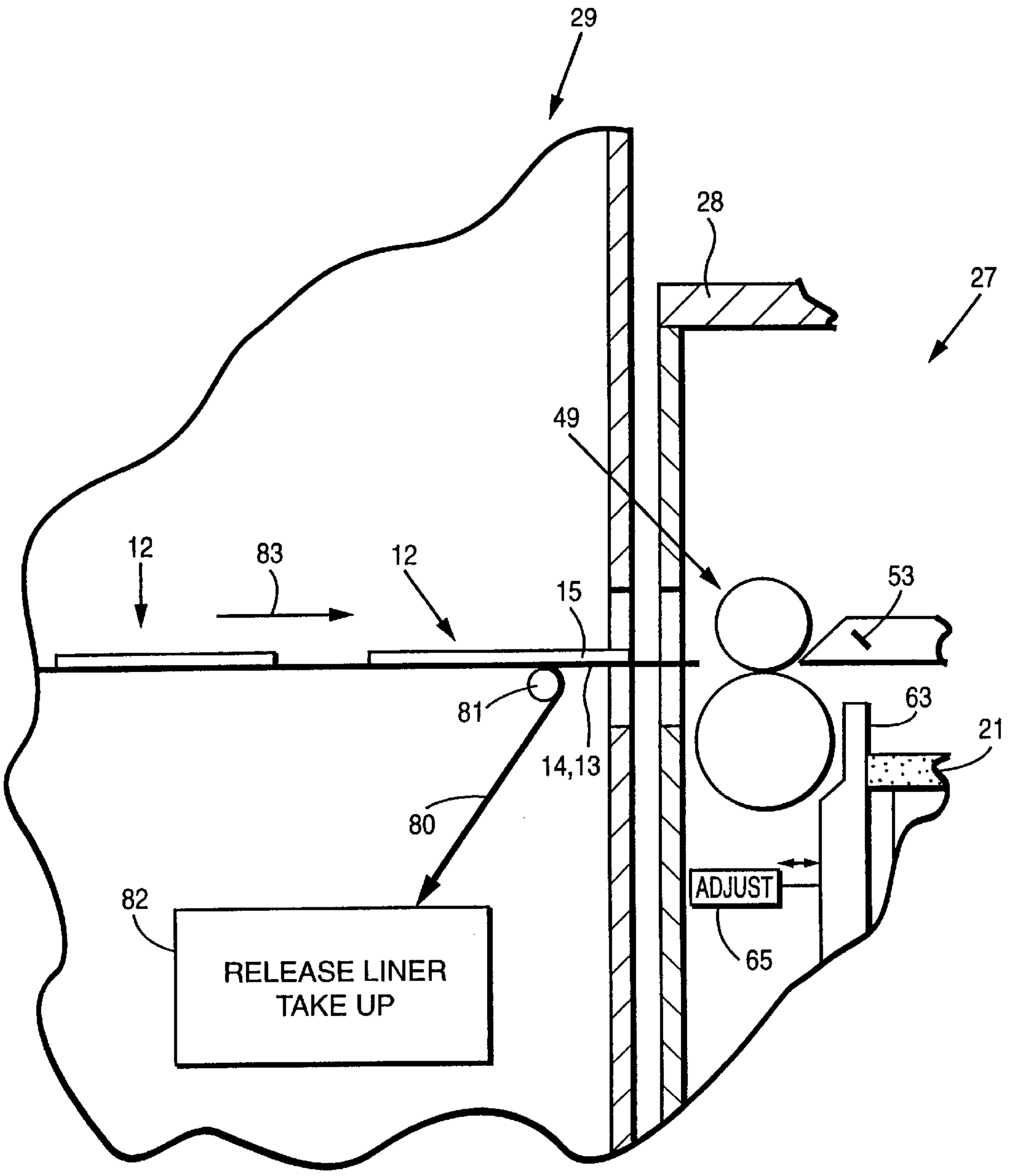
FIG. 4 is a detail side cross-sectional view of an alternative mechanism used with the printer and label applicator of FIGS. 2 and 3, when linered labels are utilized.
Figure 5:
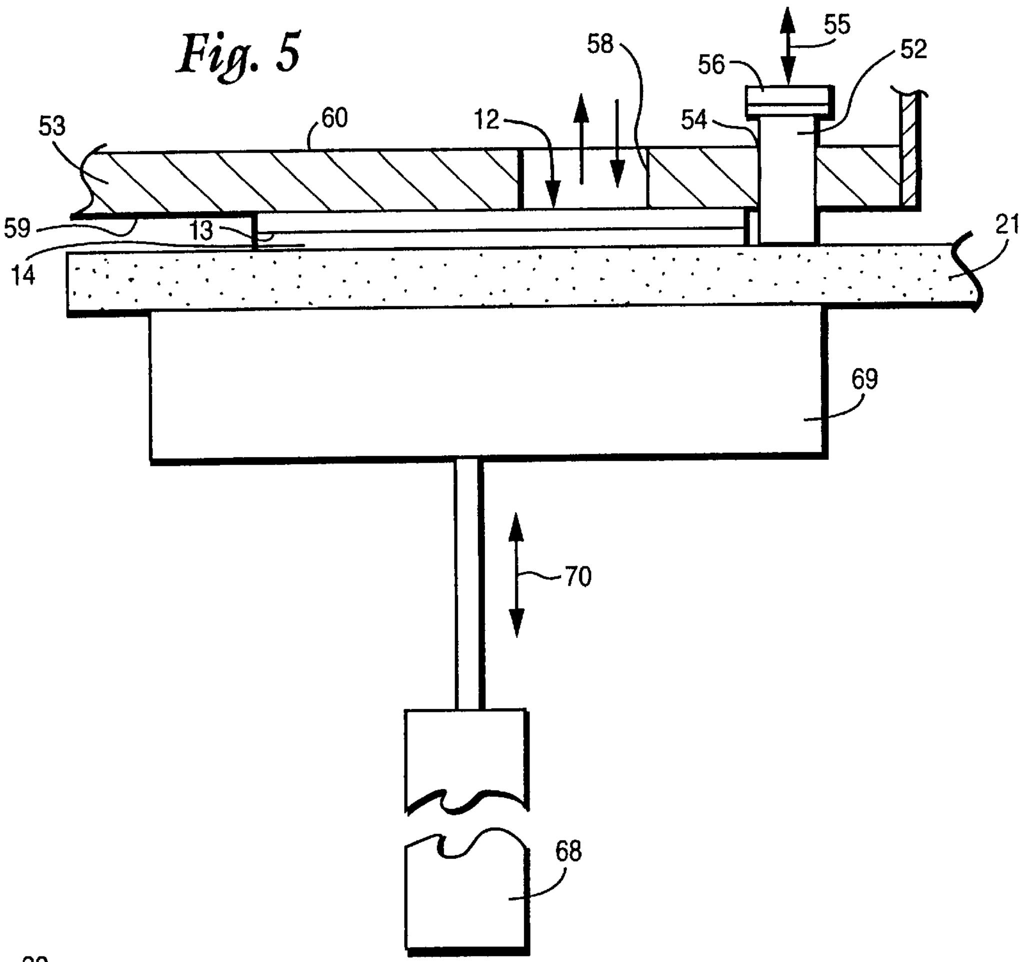
FIG. 5 is a side schematic view, partly in cross section and partly in elevation, showing in detail the movement of the mailpiece into contact with label adhesive, the label being shown greatly exaggerated in thickness for clarity of illustration.
Figure 6:
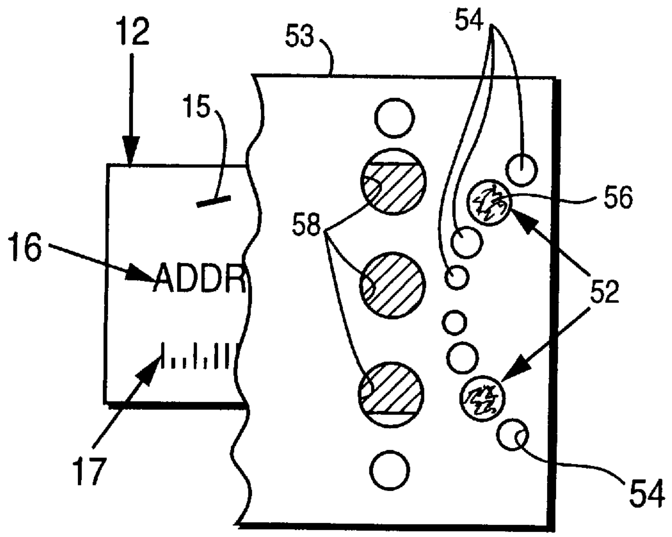
FIG. 6 is a schematic top plan view of a portion of the label support plate seen in FIG. 5.

The preferred embodiment of the label applicator 27 according to the present invention is seen most clearly in FIG. 3, but details thereof are also apparent in FIGS. 4 through 6. The label applicator 27 includes a label feed mechanism shown schematically at 49 in FIGS. 3 and 4, preferably in the form of a conventional pair of high speed rollers, driven by a conventional electric motor 50. The bottom roller 51 has an adhesive release surface, provided by any conventional technique, such as a plasma coating as described in U.S. Pat. Nos. 5,560,293 and 5,375,752.

The applicator 27 also preferably includes a label positive stop. One form the positive stop may take is illustrated by the pins 52 in FIGS. 3, 5, and 6. One or more pins 52 are mounted in a support 53, extending through a hole 54 therein. Preferably the hole 54 is slightly larger than the shank section of the pin 52 so that the pin 52 may be moved vertically with respect to the support 53, as indicated schematically by the arrow 55 in FIG. 5, the head 56 preventing the pin 52 from falling out of the opening 54. In order to provide adjustment of the position of the pin 52 to accommodate labels of different sizes or configurations, or to accommodate different placements on mailpieces 21, any suitable adjustment mechanism can be provided, such as a plurality of differentially positioned holes 54 in the support 53, as illustrated schematically in FIG. 6. FIG. 6 illustrates two pins 52 being provided as the positive label stop, although one pin, or more than two pins, may be provided. Also, the pins 52 need not have circular cross section shank portions, but rather the shank portions may have a polygon configuration with a flat surface for engaging the label 12, and the openings 54 similarly shaped.

The applicator 27 also comprises a holding device which holds the label 12 in a desired position in which it has been stopped by the positive stop 52 (see FIG. 5). The holding device may comprise a wide variety of different structures, such as a vacuum cup, support surfaces, or the like, but preferably comprises a support 53 and associated small exhaust fans 57 (see FIG. 3). One or more small electrically powered exhaust fans 57 can be provided to draw air through the at least one aperture 58 (see FIGS. 3, 5, and 6) in the support 53. The support 53 has a first face 59 against which the label 12 second face 15 is held, and a second face 60 opposite the first face 59 (see FIG. 5). The at least one aperture 58 extends between the faces 59, 60. Air sucked through the at least one aperture 58, as indicated by the arrows in FIGS. 3 and 5, provides a partial vacuum which, when the label 12 is transported by the high speed rollers 12 toward, and into contact with, the pin or pins 52, releasably holds the label 12 against the surface 59 of support 53. The air exhausted by the fans 57 moves through openings, such as the openings 61 (see FIG. 3) in the housing 28 to the surrounding environment.

The applicator 27 also further comprises a substrate (e.g. mailpiece 21) positive stop 63 (see FIGS. 3 and 4) against which the mailpiece 21 is typically manually moved. The stop 63 may comprise any structure, such as a contoured plate schematically illustrated in FIGS. 3 and 4. The position of the stop 63 may be adjusted toward and away from the opening 64 in the housing 28 through which the mailpiece 21 is moved. Adjustment may be provided by any conventional structure, illustrated schematically at 65 in FIG. 4, such as screws which slide in elongated openings, detents, cooperating linear and rotatable gears, etc. By adjusting the position of the pins 52 and the stop 63 different label 12 and mailpiece 21 sizes, configurations, and orientations, can be accommodated. Note that the labels 12 may have either portrait or landscape orientation, and likewise for the mailpiece 21, (or orientations therebetween) within the applicator 27.

In order to facilitate sliding of the mailpiece 21 into the housing 28 through opening 64, a support plate 65 (see FIGS. 2 and 3) may be provided extending outwardly from the housing 28 opposite the feed mechanism 49. The support plate 65 facilitates the manual movement of the mailpiece 21 into the housing 28 to contact the positive stop 63. If desired, one or more conventional side guides—shown in dotted line at 66 in FIG. 2—may be associated with the plate 65 to engage the sides of the mailpiece 21 under some circumstances, to ensure proper guidance thereof.

The applicator 27 also comprises automatic means for moving the mailpiece 21 at its second desired position (FIG. 3) into, and then out of, contact with the pressure sensitive adhesive 14 of the label 12 held at its first desired position (FIG. 5) against pins 52, so that the label 12 sticks to the mailpiece 21 and is automatically removed from the holding device (support 53 and fans 57) with the mailpiece 21. While the automatic moving means may comprise any conventional structure for that purpose, including pneumatic actuators or tamps, a tamp pad mounted on a screw shaft which cooperates with a stationary nut, or other structures, preferably the automatic moving means comprises a solenoid 68 which has a tamp pad 69 connected thereto, and which moves primarily vertically to move the mailpiece 21 into contact with the label adhesive 14. The label 12 is preferably above the tamp pad 69.

Figure 8:
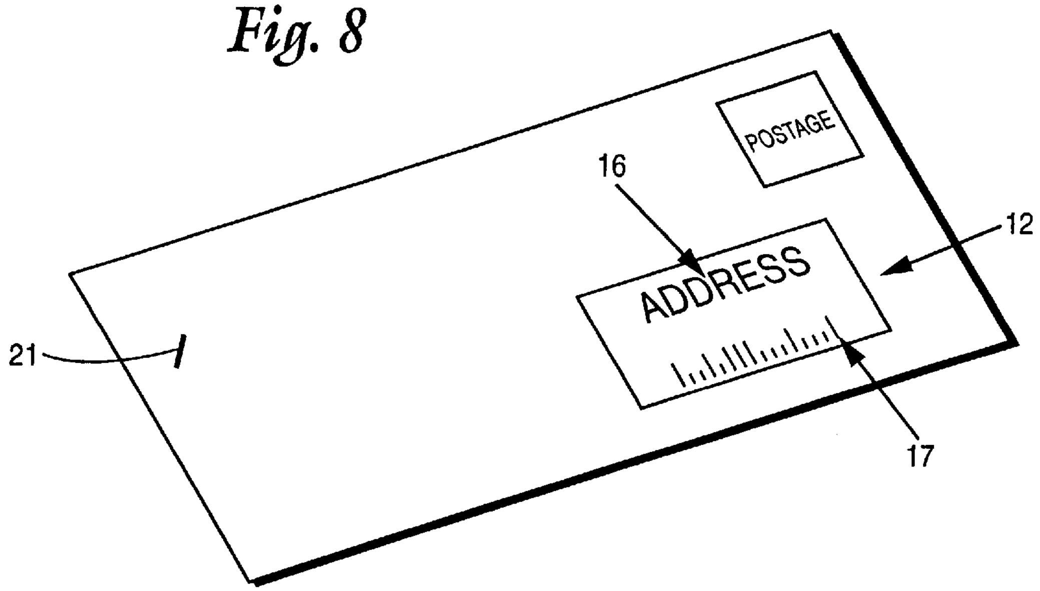
FIG. 8 is a top perspective view of a mailpiece with applied address label according to the present invention.

That is when the solenoid 68 is actuated, the tamp pad 69 is automatically substantially linearly moved upwardly from the position illustrated in FIG. 3 to the position illustrated in FIG. 5, causing the mailpiece 21 to come into firm contact with the adhesive 14. The pins 52 move vertically as indicated by arrows 55, so that they are not damaged by movement of the tamp pad 69 yet will return to a positive stop position for the next label. Preferably the solenoid 68 is controlled on a cycle so that it automatically moves up until the mailpiece 21 contacts the adhesive 14, and then after only a short delay moves back down the position illustrated in FIG. 3 (that is in which the top surface of the tamp pad 69 is substantially even with the support plate 65). The attractive force of the adhesive 14 to the mailpiece 21 is greater than the holding force provided by the partial vacuum caused by the exhaust fans 57, so that the label 12 sticks to the mailpiece 21 as illustrated in FIG. 8. The mailpiece 21 is then preferably manually removed from the housing 28 by pulling it outwardly through the opening 64.

The applicator 27 also preferably comprises at least one sensor for controlling automatic operation of the solenoid 68. In the preferred embodiment, a first sensor 72 and a second sensor 73 (see FIGS. 3 and 7) are provided. While the sensors 72, 73 preferably are electrically powered and may be of a wide variety of types (such as limit switches), in the preferred embodiment the sensor 72 preferably comprises a reflective optical sensor, and the sensor 73 comprises a through beam optical sensor.

The positions of the sensors 72, 73 are illustrated only schematically in FIG. 3, and the sensors 72, 73 may be placed where desired as long as the sensor 72 can sense the label 12 in its first desired position (FIG. 5) and the sensor 73 can sense the mailpiece 21 in its second desired position (FIG. 3). When the sensors 72, 73 detect the properly positioned label 12 and the mailpiece 21, they cause the actuation of the solenoid 68 to move the tamp pad 69 from the position illustrated in FIG. 3 to that illustrated in FIG. 5 and then back to the FIG. 3 position. For this purpose a common control 74 (see FIG. 7) of any type may be provided. The control 74 also may automatically control the cutter 41 and one or both of the motors 43, 50. The control 74 may be any conventional electronic controller, including a computer chip, a central computer for controlling other equipment, etc. Conventional manual actuators, indicated schematically at 75 in FIG. 7, may also be provided to control various of the components and test modes, to override the automatic controls, or the like.

All of the powered components in the applicator 27 are preferably electrically powered, and are connected up to the power source 46. This connection may be provided through the printer 29 itself. That is the printer may have a plug-in device or a wiring board 77 (see FIG. 3) that receives a plug 78 and/or wires 79 from the components in the applicator 27, so that no external power is required for the applicator 27 (that is all of the power—the electricity—comes through the printer 29). This means no pneumatic hookup is required, nor any other power sources, while still allowing the applicator 27 to be readily detached from the printer 29 if desired.

FIG. 3 shows the assembly according to the invention where linerless labels are handled. FIG. 4 shows the same system where conventional linered labels are provided. The only difference is the provision of a mechanism for separating and taking up the release liner for the linered labels 12. One such mechanism that may be provided is illustrated schematically in FIG. 4 where the release liner 80 is caused to move over a conventional peel bar 81, and then is taken up by a conventional release liner take-up mechanism 82, while the label 12 continues moving into contact with the high speed rolls 49 of the applicator 27. The release liner 80 with the labels 12 attached is powered in the direction 83 by any conventional components associated with a printer, such as roller or conveyor belt mechanisms.

In use of the printer 29 and applicator 27 according to the present invention (with particular reference to the FIG. 3 embodiment) linerless labels are printed by the print head 39 in a conventional manner, are cut by the cutter 41 in a conventional manner, and then are powered by low speed rollers 42 into the opening 45 into the applicator 27. In the applicator 27 the label 12 is engaged by the high speed rolls 49 and propelled into contact with one or more stop pins 52 which positively stop the label 12 in the first desired position (FIG. 5). When the label 12 is propelled into this position, it is releasably held in place by the partial vacuum caused by air being sucked through the at least one aperture 58 by the fan or fans 57, so that the label 12 is held up against the bottom surface 59 of the support 53 as illustrated in FIG. 5.

The position of label 12 is sensed by the optical sensor 72, which then—preferably acting through the control 74—shuts down the motor 43 of the low speed rolls 42, and any other drive components in the printer 29 which would tend to feed the next label. An indicator light, or some other indicator, may then indicate to the operator that the applicator 27 is ready to receive the mailpiece, and the mailpiece 21 is preferably manually fed into the housing 28 through the opening 64 into contact with the positive stop 63, so that the mailpiece 21 and label 12 are in optimum position with respect to each other. The movement of the mailpiece 21 into contact with the positive stop 63 is sensed by the optical sensor 73, which then controls—through the controller 74—the solenoid 68 to cause the tamp pad 69 to move from the position illustrated in FIG. 3 to that illustrated in FIG. 5. In the position illustrated in FIG. 5 the pins 52 have been caused to move out of the way of the tamp pad 69 and mailpiece 21, and the pressure sensitive adhesive 14 adheres to the mailpiece 21, so that when the tamp pad 69 is then, almost immediately, returned to the FIG. 3 position, the force of the adhesive 14 overcomes the vacuum caused by the airflow through the at least one aperture 58, so that the mailpiece 21 with attached label 12 (as seen in FIG. 8) moves to the position of the mailpiece 21 illustrated in FIG. 3, and can be removed by the operator. The movement of the label 12 down with the mailpiece 21 is sensed by the sensor 72 which activates the motor 43, cutter 41, and any other appropriate mechanisms to automatically move the next label 12 into place.

While the invention has been herein shown and described in what is presently conceived to be the most practical preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A label applicator comprising:

a label feed mechanism which feeds a label having a first face with pressure sensitive adhesive and a second face with indicia printed thereon;

a label positive stop cooperating with said feed mechanism to stop a label fed by the feed mechanism in a first desired position;

a holding device which holds the label in said first desired position;

a substrate positive stop which stops a substrate at a second desired position in alignment with a label held substantially stationary at said first desired position; and automatic means for moving a substrate at said second desired position into, and then out of, contact with the pressure sensitive adhesive of a label held substantially stationary at said first desired position so that the label sticks to the substrate, and is removed from the holding device with the substrate, said means comprising a linear solenoid, and a tamp pad connected thereto; and wherein said substrate positive stop is vertically below said label positive stop, and wherein said linear solenoid is directly connected to said tamp pad and is positioned so as to move said tamp pad, and a substrate thereon, only linearly and primarily upwardly to bring the substrate into contact with the label adhesive.

2. A label applicator as recited in claim 1 wherein said label positive stop is vertically movable upon contact with said tamp pad or substrate thereon, and returnable to said positive step position by gravity alone.

3. A label applicator as recited in claim 1 wherein said label feed mechanism, label positive stop, holding device, substrate positive stop, and solenoid are mounted within a housing dimensioned to fit on a desk top.

4. A label applicator as recited in claim 1 wherein said holding device comprises a support having first and second faces with one or more apertures therein extending between said faces, said first face for engaging a label; and one or more electric fans adjacent said second face and positioned to pull air through said one or more apertures, suction created by said one or more fans holding a label to said first face.

5. A label applicator as recited in claim 1 wherein said label feed mechanism, label positive stop, holding device, substrate positive stop, and automatic means are mounted within a housing dimensioned to fit on a desk top.

6. A label applicator as recited in claim 5 wherein said automatic means are controlled by a control device having at least two position sensors for sensing the position of a label and a substrate, respectively.

7. A label applicator as recited in claim 6 further comprising a printer for printing indicia on a label second face, said printer also dimensioned to fit on a desk top; and a mounting plate connecting said printer and housing together at a bottom portion of each.

8. A label applicator as recited in claim 7 wherein said automatic means comprises a solenoid, and said sensors are electrically powered optical sensors, and wherein said feed mechanism and holding device are electrically powered; electric power for said solenoid, sensors, feed mechanism, and holding device provided by connection to said printer.

9. A label applicator as recited in claim 6 for use with a mailpiece as a substrate; and further comprising a mailpiece support plate extending outwardly from said housing opposite said feed mechanism, said support plate facilitating manual movement of a mailpiece into and out of said housing to contact said substrate positive stop.

10. A method of applying address labels to mailpieces in a semiautomatic manner utilizing a label applicator including label and mailpiece positive stops in a housing, each label having a first face with pressure sensitive adhesive, and a second face with address indicia thereon, said method comprising the steps of:

(a) feeding a label into the housing until positively stopped at a first desired position so that the first face thereof is substantially uncovered;

(b) releasably holding the label in the first position;

(c) feeding a mailpiece into the housing until positively stopped at a second desired position aligned with the first position;

(d) sensing the label and mailpiece contemporaneously at the first and second positions, respectively;

(e) in response to step (d) automatically effecting relative movement of the label and mailpiece with respect to each other so that the adhesive of the label sticks to the mailpiece;

(f) removing the mailpiece from the housing, with the label applied, the label being automatically released from being held in the first position; and (g) manually adjusting the positive stop positions for label feeding and mailpiece feeding.

11. A method as recited in claim 10 wherein steps (c) and (f) are practiced manually, and step (e) is practiced by moving the mailpiece into contact with the label.

12. A method as recited in claim 11 comprising the further step of printing address indicia on the label second face substantially immediately before step (a).

13. A method as recited in claim 10 wherein (d) is practiced optically.

14. A method as recited in claim 10 wherein (c) is practiced by linearly and substantially entirely upwardly moving the mailpiece while the label is held substantially stationary while the mailpiece comes into contact with the entire pressure sensitive adhesive at the same time.

15. A desktop combined printer and label applicator assembly comprising:

a printer comprising a housing, a print head within said housing, and a source of electric power;

a label applicator disposed in a housing;

a feed mechanism which feeds printed labels from said printer housing into said label applicator housing, said feed mechanism being electrically powered;

said housings being dimensioned and configured to collectively fit on a desktop;

an electrically powered label holding device disposed in said label applicator housing;

an electrically powered device which effects relative movement between a substrate and the label so that pressure sensitive adhesive on one face of the label moves into contact with, and adheres to, the substrate, disposed within said label applicator housing;

electrically powered sensors for sensing the relative positions of the label and substrate, said sensors disposed in said label applicator housing;

said electrically powered holding device, moving device, and sensors, connected up to the same source of electrical power as said printer, and a mounting plate connecting said printer housing and said label applicator housing together at a bottom portion of each and having mounting feet extending downwardly therefrom.

16. An assembly as recited in claim 15 wherein said relative movement effecting device comprises a linear actuator for effecting vertical upward movement of a substrate into contact with the pressure sensitive adhesive of a label held by said holding mechanism above said linear actuator.

17. An assembly as recited in claim 15 wherein said holding device comprises a support having first and second faces with one or more apertures therein extending between said faces, said first face for engaging a label; and one or more electric fans adjacent said second face and positioned to pull air through said one or more apertures, suction created by said one or more fans holding a label to said first face.

18. A label applicator comprising:

a label feed mechanism which feeds a label having a first face with pressure sensitive adhesive and a second face with indicia printed thereon;

a label positive stop cooperating with said feed mechanism to stop a label fed by the feed mechanism in a first desired position;

a holding device which holds the label in said first desired position;

a substrate positive stop which stops a substrate at a second desired position in alignment with a label at said first desired position; and automatic means for moving a substrate at said second desired position into, and then out of, contact with the pressure sensitive adhesive of a label held substantially stationary at said first desired position so that the label sticks to the substrate, and is removed from the holding device with the substrate;

said automatic means controlled by a control device having at least two position sensors for sensing the position of a label and a substrate, respectively;

a printer for printing indicia on a label second face, and a mounting plate connecting said printer and housing together at a bottom portion of each; and said label feed mechanism, label positive stop, holding device, substrate positive stop, printer means, and automatic means are mounted within a housing dimensioned to fit on a desk top.

19. A label applicator as recited in claim 18 wherein said automatic means comprises a solenoid, and said sensors are electrically powered optical sensors, and wherein said feed mechanism and holding device are electrically powered; electric power for said solenoid, sensors, feed mechanism, and holding device provided by connection to said printer.

20. A label applicator for use with a mailpiece as a substrate and comprising:

a label feed mechanism which feeds a label having a first face with pressure sensitive adhesive and a second face with indicia printed thereon;

a label positive stop cooperating with said feed mechanism to stop a label fed by the feed mechanism in a first desired position;

a holding device which holds the label in said first desired position;

a substrate positive stop which stops a substrate at a second desired position into, and then out of, contact with the pressure sensitive adhesive of a label held substantially stationary at said first desired position so that the label sticks to the substrate, and is removed from the holding device with the substrate;

said automatic means controlled by a control device having at least two position sensors for sensing the position of a label and a substrate, respectively; and a mailpiece support plate extending outwardly from said housing opposite said feed mechanism, said support plate facilitating manual movement of a mailpiece into and out of said housing to contact said substrate positive stop.

* * * * *